(12) United States Patent
Johnson et al.

(10) Patent No.: US 7,542,653 B2
(45) Date of Patent: Jun. 2, 2009

(54) PASSIVE FIBER ORGANIZER FOR MESH NETWORK NODE INTERCONNECTIONS

(75) Inventors: Ronald Johnson, Petaluma, CA (US); Stefano Piciaccia, Milan (IT); Ornan Gerstel, Los Altos, CA (US); Mauro Rudi Casanova, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 11/467,996

(22) Filed: Aug. 29, 2006

(65) Prior Publication Data
US 2008/0205819 A1    Aug. 28, 2008

(51) Int. Cl.
*G02B 6/42* (2006.01)
*H04J 14/00* (2006.01)

(52) U.S. Cl. .............. 386/17; 385/15; 385/24; 385/42; 385/31; 385/53; 385/55; 385/59; 385/88; 385/89; 385/92; 385/114; 385/134; 385/135; 398/68; 398/79; 398/83; 398/63

(58) Field of Classification Search ............ 385/15, 385/16, 17, 18, 24, 31, 42, 88, 92, 53, 114, 385/134, 135, 136, 140, 55, 59; 398/68, 398/70, 71, 72, 79, 82, 83, 58, 59, 60, 61, 398/63
See application file for complete search history.

(56) References Cited

U.S. PATENT DOCUMENTS

| | | | |
|---|---|---|---|
| 6,307,986 B1 * | 10/2001 | Duerksen et al. | 385/24 |
| 6,314,230 B1 * | 11/2001 | Daoud et al. | 385/135 |
| 6,574,386 B1 * | 6/2003 | Sufleta | 385/16 |
| 6,687,463 B1 * | 2/2004 | Hutchison et al. | 398/83 |
| 7,382,961 B2 * | 6/2008 | Xin et al. | 385/135 |
| 2003/0072052 A1 | 4/2003 | Graves et al. | 359/124 |
| 2003/0123881 A1 | 7/2003 | Milton et al. | 398/83 |
| 2006/0275009 A1 * | 12/2006 | Ellison et al. | 385/135 |
| 2008/0205819 A1 * | 8/2008 | Johnson et al. | 385/17 |

* cited by examiner

*Primary Examiner*—Brian M Healy
(74) *Attorney, Agent, or Firm*—Edell, Shapiro & Finnan, LLC

(57) ABSTRACT

A mesh optical network node has switch cards which carry active components, such as wavelength routers to switch the paths of optical signals through the node and a fiber organizer handles the numerous optical fiber interconnections among the switch cards. The fiber organizer has no active components and can include optical paths to verify not only that a switch card connection to the fiber organizer has been made but that the connection is properly made.

47 Claims, 17 Drawing Sheets

US 7,542,653 B2

PASSIVE FIBER ORGANIZER FOR MESH NETWORK NODE INTERCONNECTIONS

BACKGROUND OF THE INVENTION

The present invention is related to WDM (Wavelength Division Multiplexing) optical networks and, more particularly, to the organization of optical fibers at a WDM network node.

In WDM systems, multiple optical signals having different wavelengths share an optical fiber, each wavelength defining a particular communication channel. This technique has many advantages in implementing optical communication systems including increased capacity and the ability to use passive optical components to redirect a portion of the data flowing along the fiber for processing at an intermediate node. Hence WDM (Wavelength Division Multiplexing) is used herein in this inclusive sense to include any system using optical wavelengths to define channels, such as DWDM (Dense Wave Division Multiplexing), unless the term is clearly stated to refer to the ITU (International Telecommunications Union) defined optical network, which has a grid of specific wavelength communication channels and wavelength spacings between the channels.

Optical networks are organized into ring and mesh networks. In a mesh network, each network node is connected to other nodes by a plurality of optical fibers so the network appears as a mesh topologically. A loop network can be considered as a degenerate case of a mesh network in which each node is connected to two other nodes and appears as a loop topologically.

Many current WDM networks are loop networks, but they are being reorganized as mesh networks. However, in a mesh network the simple arrangement of optical fiber interconnections to other nodes and the add and drop functions in a loop node are replaced by the numerous and complex interconnections of switching elements to several other nodes and for add/drop functions of a mesh node. Not only are the mesh node interconnections complicated, and likely to result in misconnections, but also verification of connections is difficult. Current network systems do not allow for easy installation that guarantee correct connectivity without very complicated test procedures requiring extra hardware.

The present invention addresses at least some of these challenges with optical fiber organizers for a network mesh node which not only reduce the complexity of the interconnections and the possibility of errors, but also facilitate the verification of the node connections.

DETAILED DESCRIPTION OF THE INVENTION

Figure 1A:
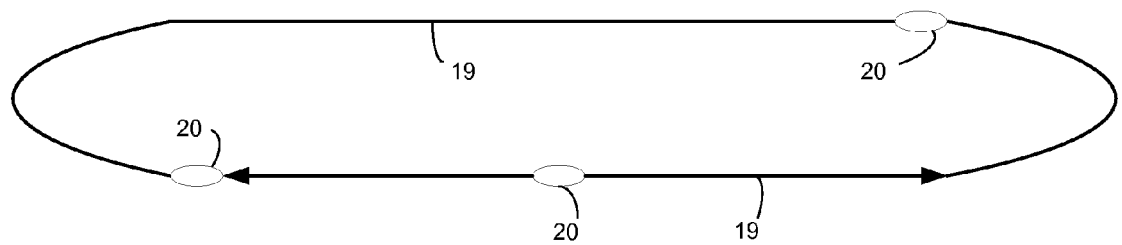
FIG. 1A is a representation of a node in a loop network.
Figure 1B:
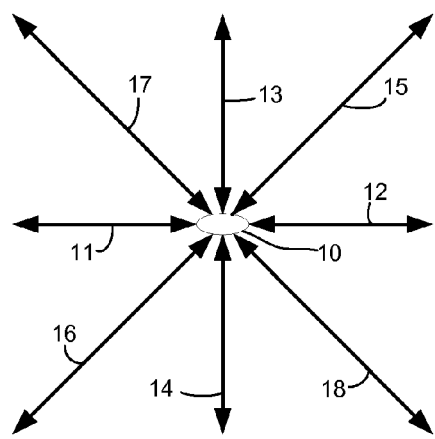
FIG. 1B is a representation of a node in a mesh network.

Currently, many optical networks have a loop topology. A representative loop network is illustrated in FIG. 1A in which nodes 20 in FIG. 1B are connected by optical fibers which carry optical signals in two directions to the other nodes 20 in a ring, i.e., a closed loop 19. Arrows show that the ring 19 has at least two optical fibers, each optical fiber carrying signals in opposite directions around the ring. Each node 20 is connected to only two other nodes 20.

As stated earlier, many of these loop networks are evolving toward a mesh network topology in which a network node is typically connected to more than two other nodes. FIG. 1B illustrates a representative node in a mesh network. The representative node 10 is connected by optical fibers which carry optical signals to and from the node in a plurality of directions to other nodes of the network. The double-headed arrows 11-18 represent at least two optical fibers, one optical fiber to carry signals in each direction. The arrow 11 illustrates optical signals to, and from, the node 10 from, and to, the "west" direction. The arrow 12 illustrates optical signals to, and from, the node 10 from, and to, the "east" direction. Signals to and from the "north" directions are indicated by an arrow 13 and signals to and from the "south" directions are indicated by an arrow 14. The arrows 15-18 indicate signals in the "northeast," "southwest," "northwest," and "southeast" directions respectively, and also are representative of a generalized mesh in which signal directions are not limited to north/south, east/west directions.

Hence a node in a mesh network has numerous and complex interconnections with switching devices to direct signals from optical fibers in one direction to optical fibers in another direction. Photonic cross-connects (denoted as PXCs), which help automate the connections between the network nodes, provide one switching architecture for a mesh node. However, a PXC is a large and complex device, typically an array of switches with hundreds of inputs by hundreds of outputs. Furthermore, PXCs are very costly and complicated devices and in many applications, PXCs cannot justify their costs.

Figure 2A:
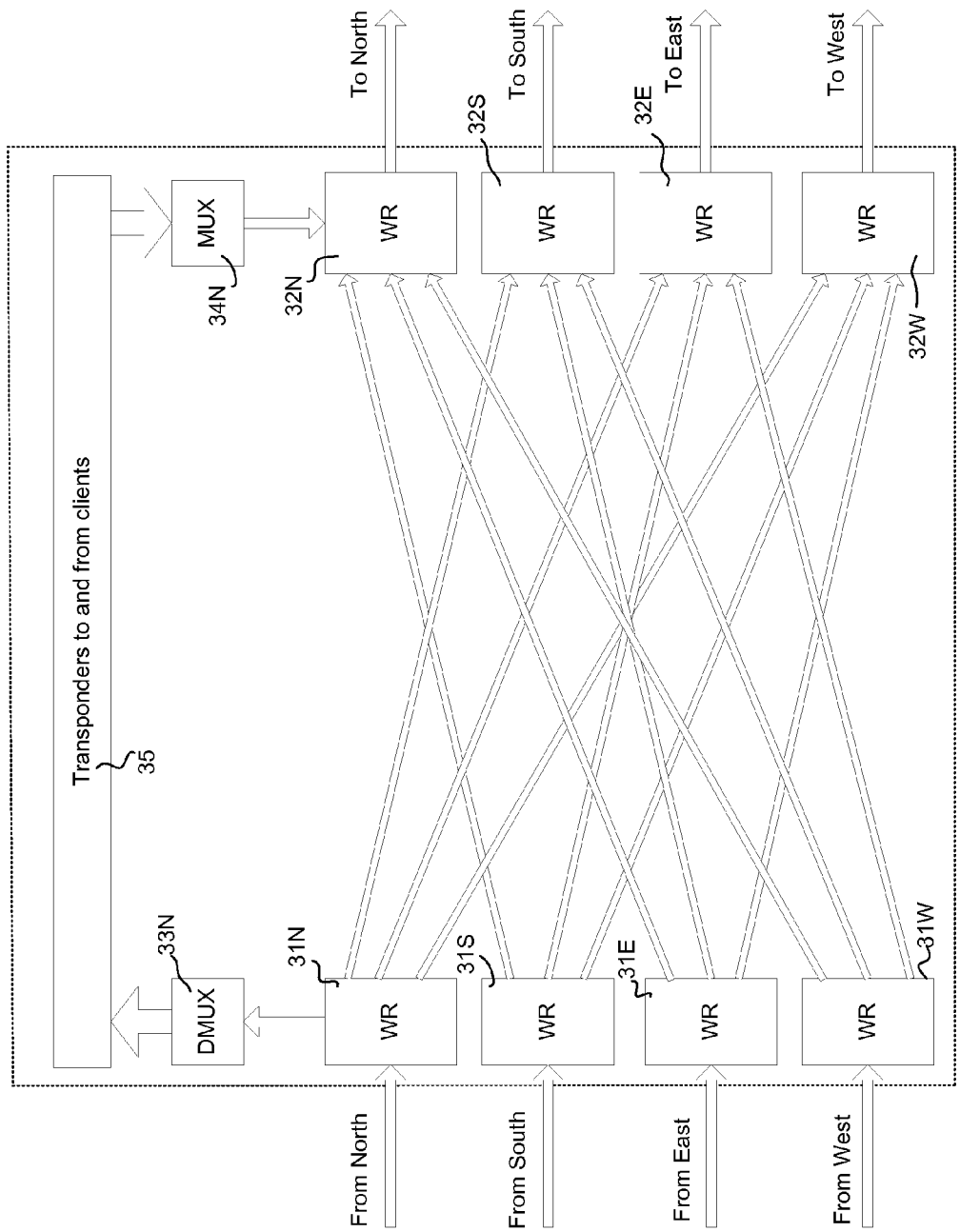
FIG. 2A is a representation of a distributed switching architecture for a mesh node.

Distributed switching provides a simpler architecture in which each optical fiber connected to the node has switching elements associated with the optical fiber in each network direction from the network node. WDM switches, such as wavelength selective switches or wavelength routers, can be used for the switching elements. These devices can switch optical signals from an input optical fiber to an output optical fiber by wavelength. Such switches are much smaller (typically 16×16 or less), far less complicated and much cheaper than PXCs. FIG. 2A illustrates a distributed switching architecture for a mesh node. Only elements directly related to the present invention are shown. Other elements, such as optical amplifiers, are omitted. Furthermore, in this example only four network directions are shown to illustrate the optical fiber interconnections to other nodes without undue complexity.

In FIG. 2A, four input wavelength routers 31N, 31S, 31E and 31W, each operating as a 1×4 switch, are connected to an optical fiber from the north, south, east and west network directions respectively. Each of the input wavelength routers is connected to an input optical fiber from one direction and to four output optical fibers, three of which are connected as inputs to output wavelength routers 32N, 32S, 32E and 32W, each operating as a 4×1 switch. Each input wavelength router is connected to each output wavelength router except for its corresponding directional counterpart. That is, the input wavelength router 31N for the north direction is not connected to the north direction output wavelength router 32N; the input wavelength router 31S for the south direction is not connected to the south direction output wavelength router 32S; and so forth. Such connections are not required since they represent optical signals from one direction returning back to the same direction.

The fourth output fiber of each input wavelength router 31N, 31S, 31E and 31W is connected to one of four demultiplexers, of which only one 33N is shown, so that each of the four demultiplexers 33N (and 33S, 33E and 33W not shown) is connected to its corresponding input wavelength router 31N, 31S, 31E and 31W respectively. A block 35 represents transponders and other connections to clients which receive signals dropped at this node and/or send signals to be added at this node. The four demultiplexers handle the signals from which of the four network directions are dropped. The block 35 is also connected to four multiplexers, of which only one 34N is shown, to add signals from the clients to the output wavelength routers 32N, 32S, 32E and 32W. Each of the four multiplexers 34N (and 34S, 34E and 34W not shown) is connected to its corresponding output wavelength router 32N, 32S, 32E and 32W respectively. Depending upon which multiplexer is selected, the add signals are passed to a particular network direction from the node.

Incoming optical signals from any direction can be switched by the input wavelength routers 31N, 31S, 31E and 31W to the desired one of the output wavelength routers 32N, 32S, 32E and 32W, or to the demultiplexer 33N, 33S, 33E and 33W for dropping selected optical signals. The output wavelength routers 32N, 32S, 32E and 32W select optical signals from the input wavelength routers to pass on to their respective output directions.

Figure 2B:
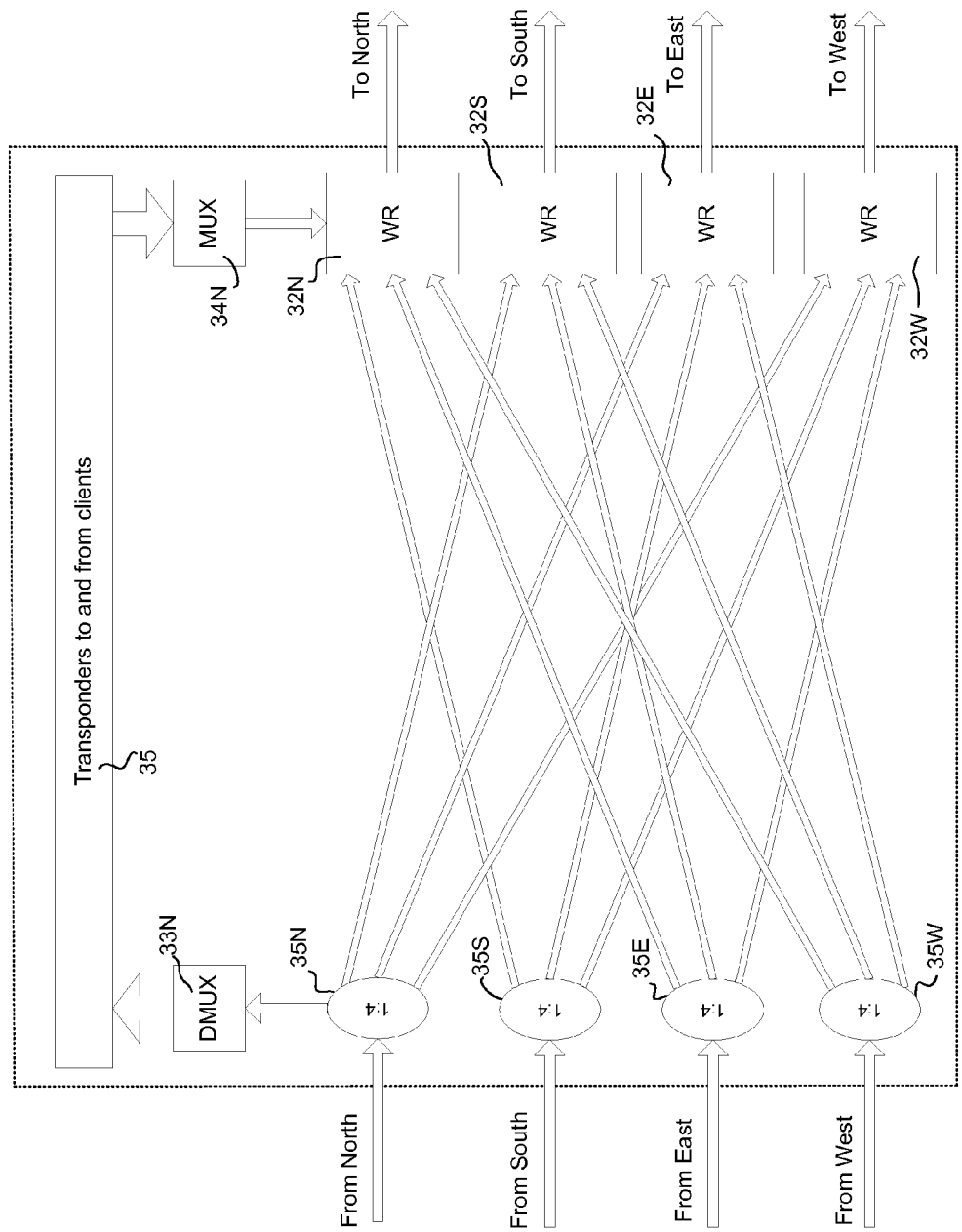
FIG. 2B is a variation of FIG. 2A distributed switching architecture.

But wavelength routers are still relatively expensive compared to passive component devices. FIG. 2B illustrates a distributed switching architecture in which the FIG. 2A input wavelength routers are replaced by optical splitters. An optical splitter simply splits incoming optical signals to all of the splitter's output fibers. In the FIG. 2B architecture 1:4 optical splitters 35N, 35S, 35E and 35W replace the FIG. 2A input wavelength routers 31N, 31S, 31E and 31W. The other elements of the architecture remain the same or the functions of the elements remain the same so that the same reference numerals from FIG. 2A are used in FIG. 2B. This practice is also followed in the other drawings. In this architecture the output wavelength routers 32N, 32S, 32E and 32W perform all the wavelength selection. Each output wavelength router receives all the incoming signals received by its connected optical splitters and selects the desired wavelengths for output.

As can be seen in FIGS. 2A and 2B, the optical interconnections between the input wavelength routers and the output wavelength routers are complicated and an opportunity for misconnections. Of course, if the node is the focus of more optical fibers in more network directions, the complexity of the interconnections rises sharply.

Figure 3:
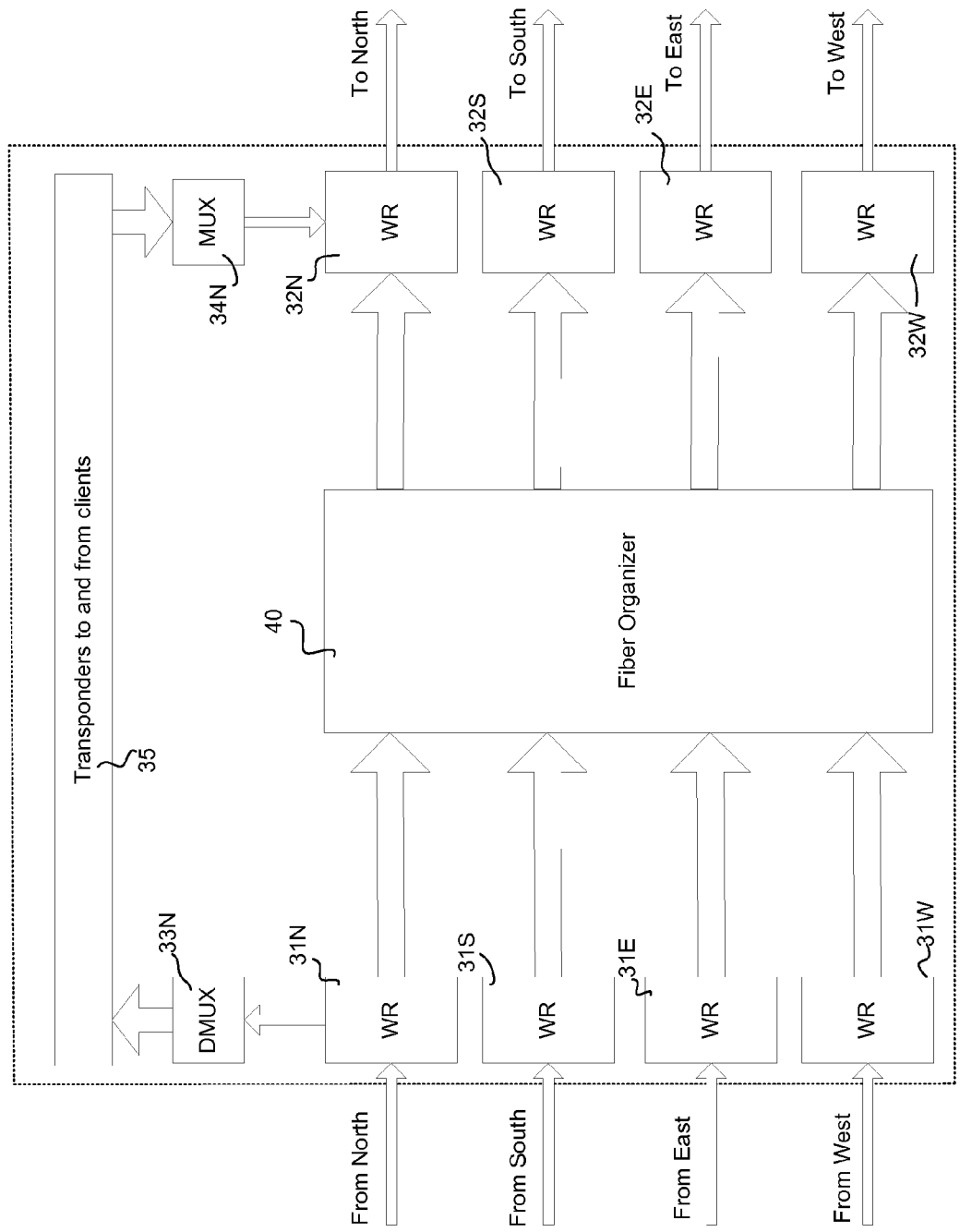
FIG. 3 shows the fiber organizer in the FIG. 2A distributed switching architecture in accordance with one embodiment of the present invention.

The present invention offers a way of organizing distributed switching architectures to simplify the complex interconnections required. FIG. 3 shows a fiber organizer 40 which connects the input wavelength routers 31N, 31S, 31E and 31W to the output wavelength routers_32N, 32S, 32E and 32W. Instead of separate optical fibers, the output of each input wavelength router 31N, 31S, 31E and 31W is connected through a ribbon cable to an input port of the fiber organizer 40 by a simple ribbon connector, e.g., an MPO (Multi-Path Optical) connector, or an array connector. Similarly, a ribbon cable connects an output port of the fiber organizer 40 to one of the output wavelength routers 32N, 32S, 32E and 32W. Alternatively, individual patch cords can be used since the input and output ports of the fiber organizer 40 are located close to the corresponding input and output wavelength routers. The fiber organizer 40 is a passive device, i.e., no active devices are used in the fiber organizer 40, which reduces costs and the likelihood of failure.

It should be noted that though the FIG. 2A architecture is shown, the described organization is equally applicable to the FIG. 2B architecture. In fact, as described below, the distributed switching architecture can be organized as a fiber organizer and a plurality of switch cards containing the switching and/or splitting elements and any active elements, such as optical amplifiers.

Figure 4A:
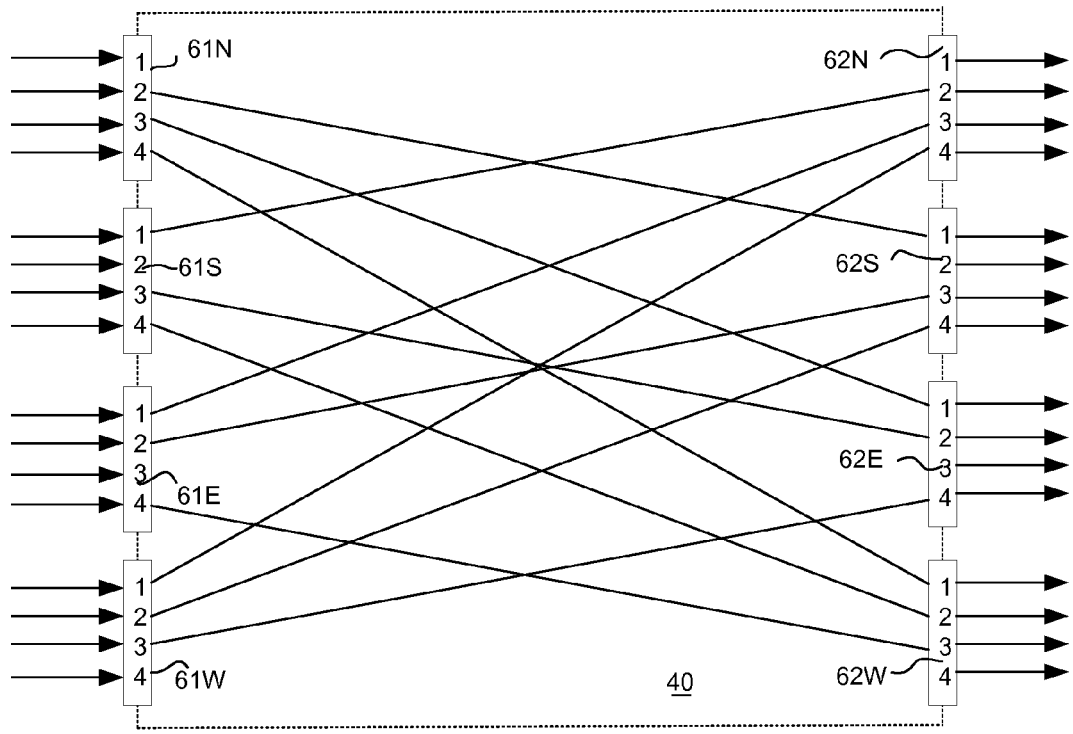
FIG. 4A shows the details of one embodiment of the FIG. 3 fiber organizer in accordance with the present invention.

FIG. 4A shows one arrangement of the fiber organizer 40. The interconnecting and previously free optical fibers shown in FIGS. 2A and 2B are incorporated into the fiber organizer 40. Each input port 61N, 61S, 61E and 61W, preferably in the form of a ribbon connector or array connector, is connected by optical fibers to three of the four output ports 62N, 62S, 62E and 62W, also preferably in the form of ribbon connectors. For example, the input port 61N has its position 2 connected by an optical fiber to position 1 of the output port 62S; position 3 connected by an optical fiber to position 1 of the output port 62E; and position 4 connected by an optical fiber to position 1 of the output port 62W. Each input port 61N, 61S, 61E and 61W is connected to its corresponding input wavelength router 31N, 31S, 31E and 31W or splitter 35N, 35S, 35E and 35W, and each output port 62N, 62S, 62E and 62W is connected to its corresponding output wavelength router 32N, 32S, 32E and 32W, as described with respect to FIG. 3. As explained previously, each input port 61N, 61S, 61E and 61W is not connected to its corresponding output port 62N, 62S, 62E and 62W since such paths represent optical signals from one direction being illogically switched back toward the same direction.

The fiber organizer 40 is made from a metal or plastic housing to provide a base for mounting the input and output port connectors and for protecting the interconnecting optical fibers. Alternatively, the housing can be made of solid plastic which encases the interconnecting optical fibers with locations for the connectors at the edges of the housing where the fibers emerge.

Beyond providing simple connectivity between the input wavelength routers or splitters and the output wavelength routers, the fiber organizer 40 can be arranged to detect misconnections or bad connections and to verify proper connections. Control line optical fibers work with switch cards which carry the input wavelength routers (and splitters) and output wavelength routers and which engage the fiber organizer connectors 61N, 61S, 61E and 61W, and 62N, 62S, 62E and 62W with complementary connectors. More details about switch cards and their relationship to the fiber organizer are found below.

Figure 4B:
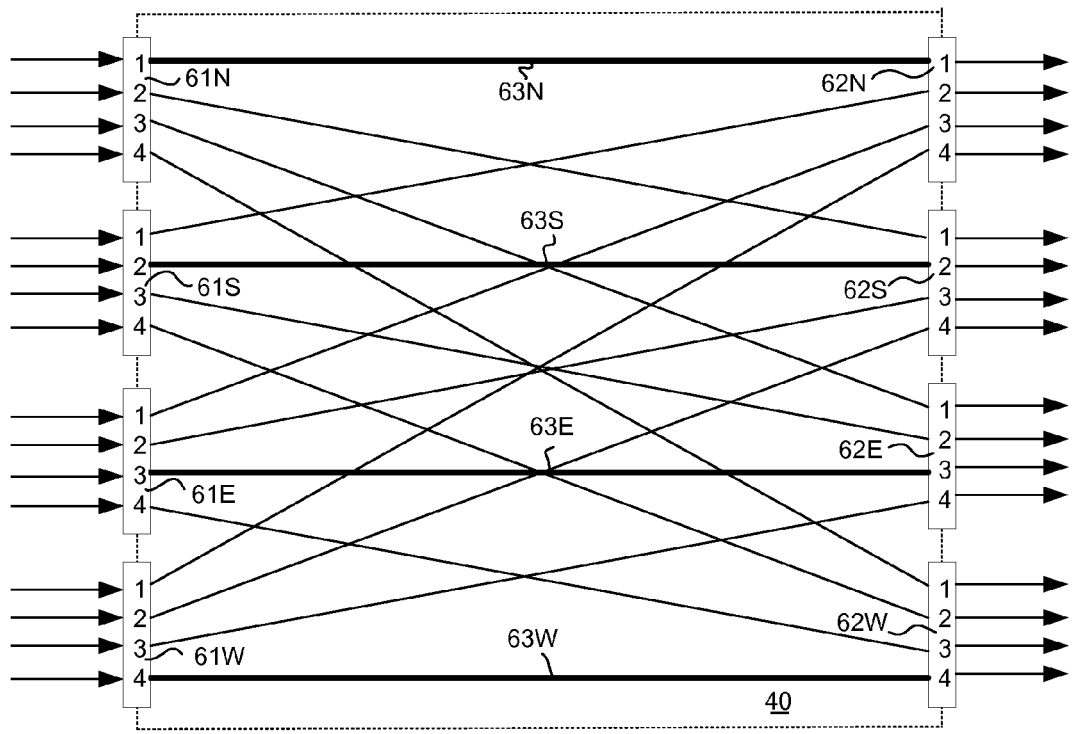
FIG. 4B shows the details of another embodiment of the FIG. 3 fiber organizer in accordance with the present invention.
Figure 4C:
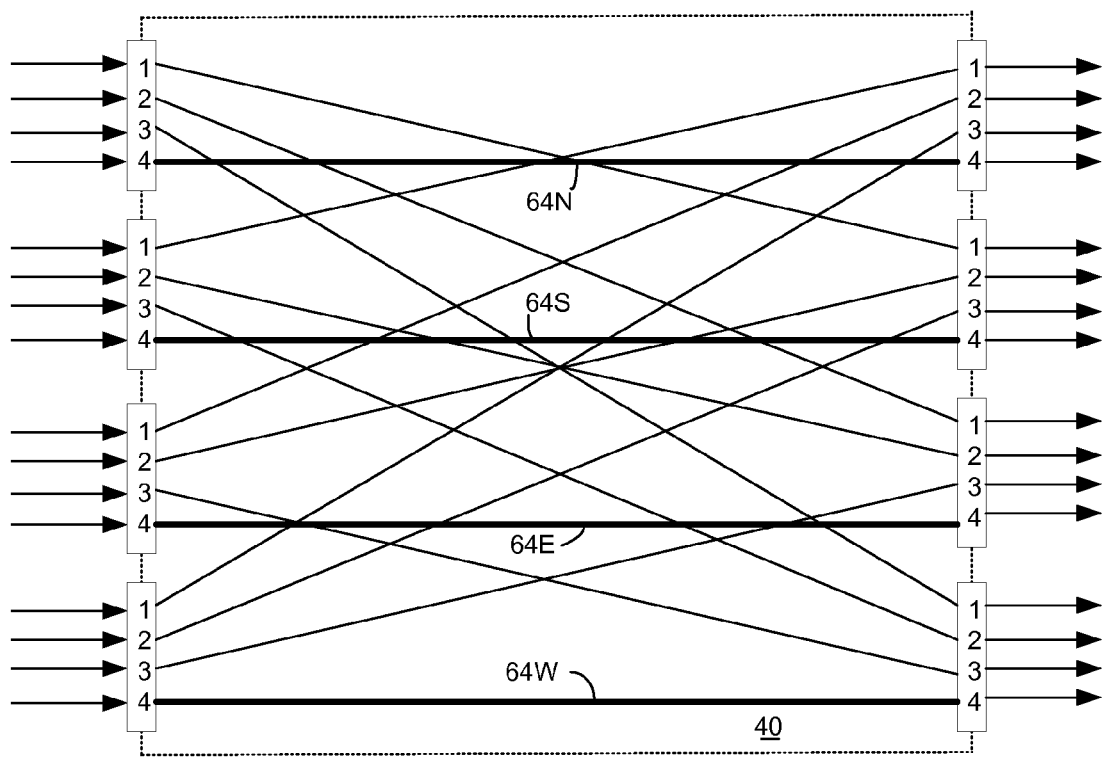
FIG. 4C shows the details of still another embodiment of the FIG. 3 fiber organizer in accordance with the present invention.

In FIG. 4B control lines 63N, 63S, 63E and 63W which are indicated by bold lines are added to the fiber organizer 40 of FIG. 4A. Each control line, an optical fiber, corresponds to one of the node directions and the corresponding input and output ports. The control lines 63N, 63S, 63E and 63W have a variable position in each port. The control line 63N connects the port 61N at fiber position 1 with the output port 62N at fiber position 1; the control line 63S connects the input port 61S at position 2 to the output port 62S at position 2; and so forth. On the other hand, the fiber organizer in FIG. 4C has the control lines located in the same position, in this example, position 4 of each input and output port. It should be noted that the control lines in the fiber organizer 40 occupy positions in the ports which are otherwise vacant. Hence no function is sacrificed for the added control lines.

The control lines match optical fibers which are part of the ribbon cable connecting the fiber organizer to the switch cards and the wavelength routers (and splitters), as described below. On the switch cards are low-cost light sources, e.g., LEDs (light-emitting diodes) and light detectors, e.g., PDs (photodiodes). A switch card typically handles at least the optical signals for one direction, i.e., the optical signals to the node from a particular direction and optical signals from the node to that direction. Hence a switch card is connected to both the input and output ports of one direction in the fiber organizer 40. An LED on the switch card generates light on the control line for the input port and a PD on the control line for the output port receives the light from the LED if the connections are properly made between the switch card and the fiber organizer 40.

FIGS. 5A-5D illustrate the relationship of the fiber organizer and the switch cards, and also the different techniques for verifying connections with the control lines in the fiber organizer, according to the present invention. Each switch card is shown twice in the drawings, on the input side and on the output side of the fiber organizer, and the fiber organizer is shown only partially and connected to only two switch cards, each of which handles the optical signals on optical fibers to and from one network direction. Hence the passive fiber organizer provides the necessary connections between the replaceable switch cards which are connected to network direction optical fibers and carry active elements of the distributed switching architecture.

Figure 5A:
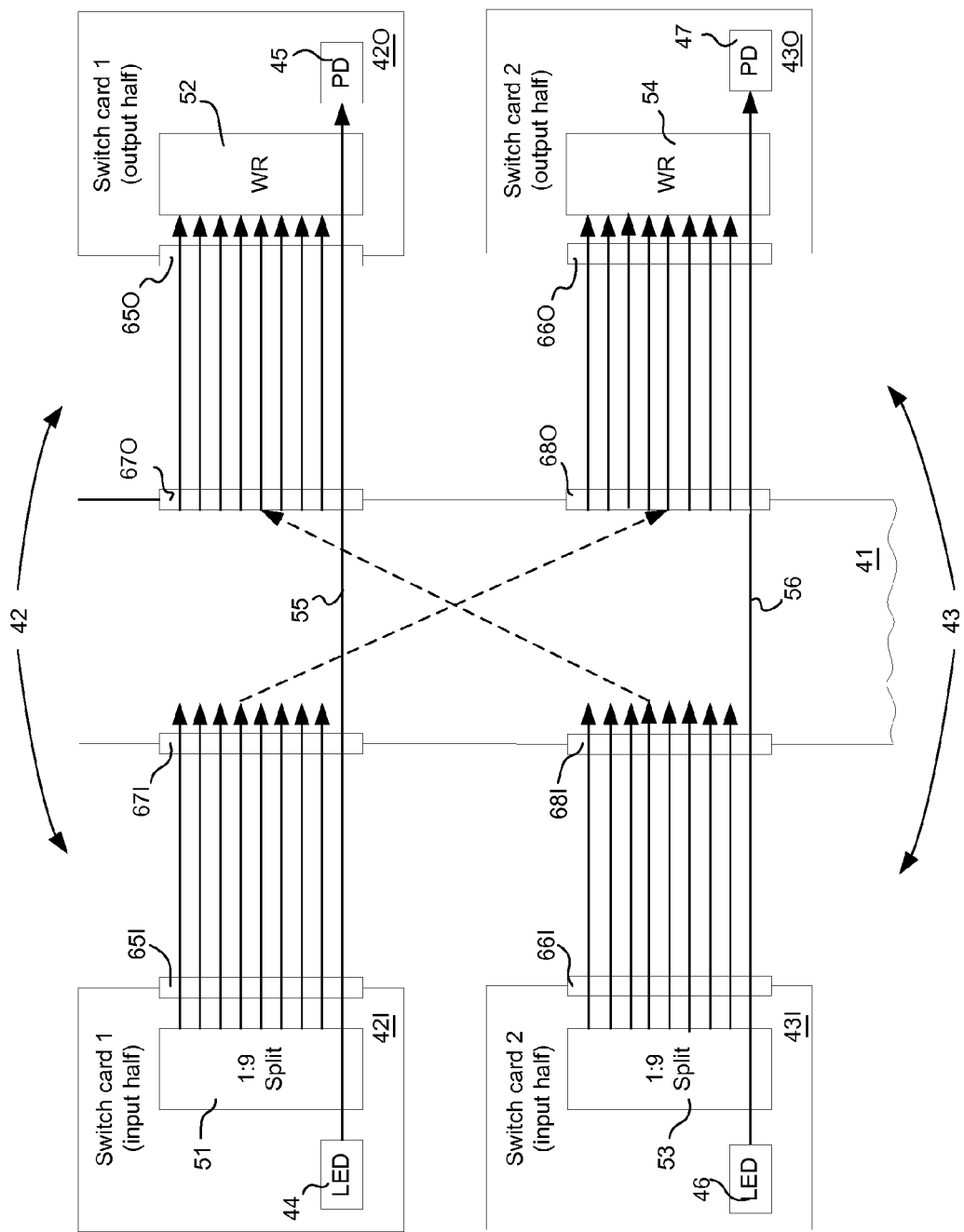
FIG. 5A illustrates a distributed switching architecture implemented with a fiber organizer and switch cards arranged and organized to verify the connection between the fiber organizer and switch cards, according to an embodiment of the present invention.

In FIG. 5A two switch cards 42 and 43 are shown connected to the fiber organizer 41. Each switch card is shown by its input half, e.g., 42I, and its output half, e.g., 43O. Other switch cards and the rest of the fiber organizer 41 are not shown. Rather than input wavelength routers, 1:9 optical splitters 51, 53 are used in the input halves 42I and 43I of the switch cards shown. The splitting ratios indicate that there are nine directions to and from the network node (or that the described distributed switching architecture can handle up to nine directions). Not shown is the ninth fractional split for the drop demultiplexer (similar to the demultiplexers in FIGS. 2A, 2B and 3). Fiber organizer input ports 67I, 68I are connected to the switch card input halves 42I, 43I through ports 65I and 66I. Fiber organizer output ports 67O, 68O are connected to the switch card output halves 42O, 43O through ports 65O, 66O.

An LED 44, 46 on a switch card 42, 43 respectively is connected at one position of the port 65I, 66I. The corresponding position of the input port 67I, 68I of the fiber organizer 41 is connected by a control line 55, 56 to a corresponding of the output port 67O, 68O. This position corresponds to a position in the switch card port 65O, 66O which is connected to a photodiode 45, 47 in the switch card 42, 43. When the switch card 42, 43 is properly connected to the fiber organizer 41, each LED 44, 46 sends an optical signal through the fiber organizer control line 55, 56 back to the switch card and its PD 45, 47. In this manner, a loss of connection can be detected, but not a misconnection to ports of fiber organizer 41, which is critical to ensure that the port connections between the switch cards and the fiber organizer are correct.

Figure 5B:
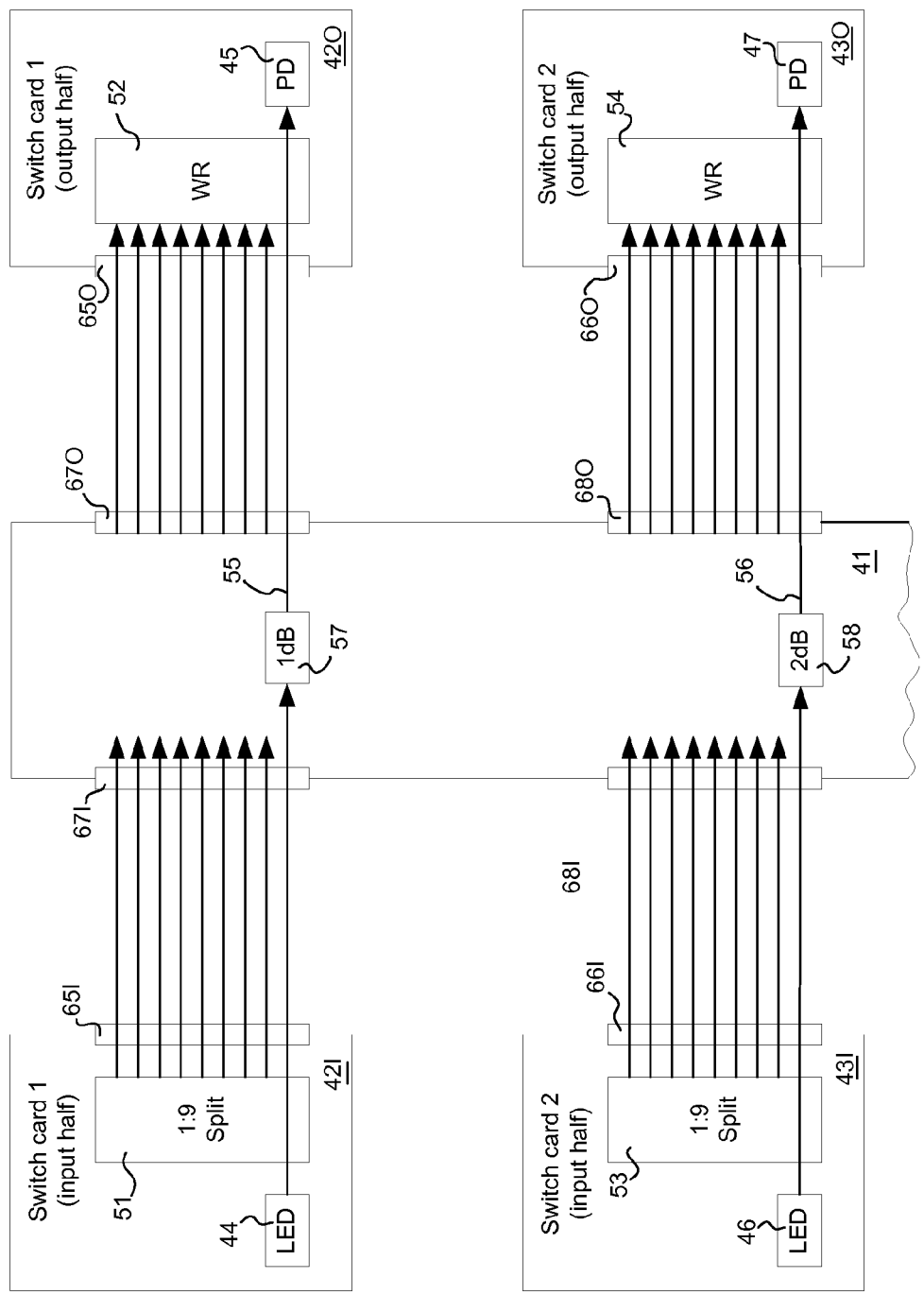
FIG. 5B illustrates another arrangement and organization of a fiber organizer and switch cards which verifies the correct connection between the fiber organizer and switch cards, according to another embodiment of the present invention.

FIG. 5B shows the same arrangement as in FIG. 5A, except that an attenuator is placed on each control line 55, 56. Each attenuator 57, 58 provides a different attenuation level on each control line 55, 56 to identify the particular port to which the switch card is connected. Loss of connections and misconnections can be detected. However, if a connector is dirty, the wrong attenuation value for the port may be assumed.

Figure 5C:
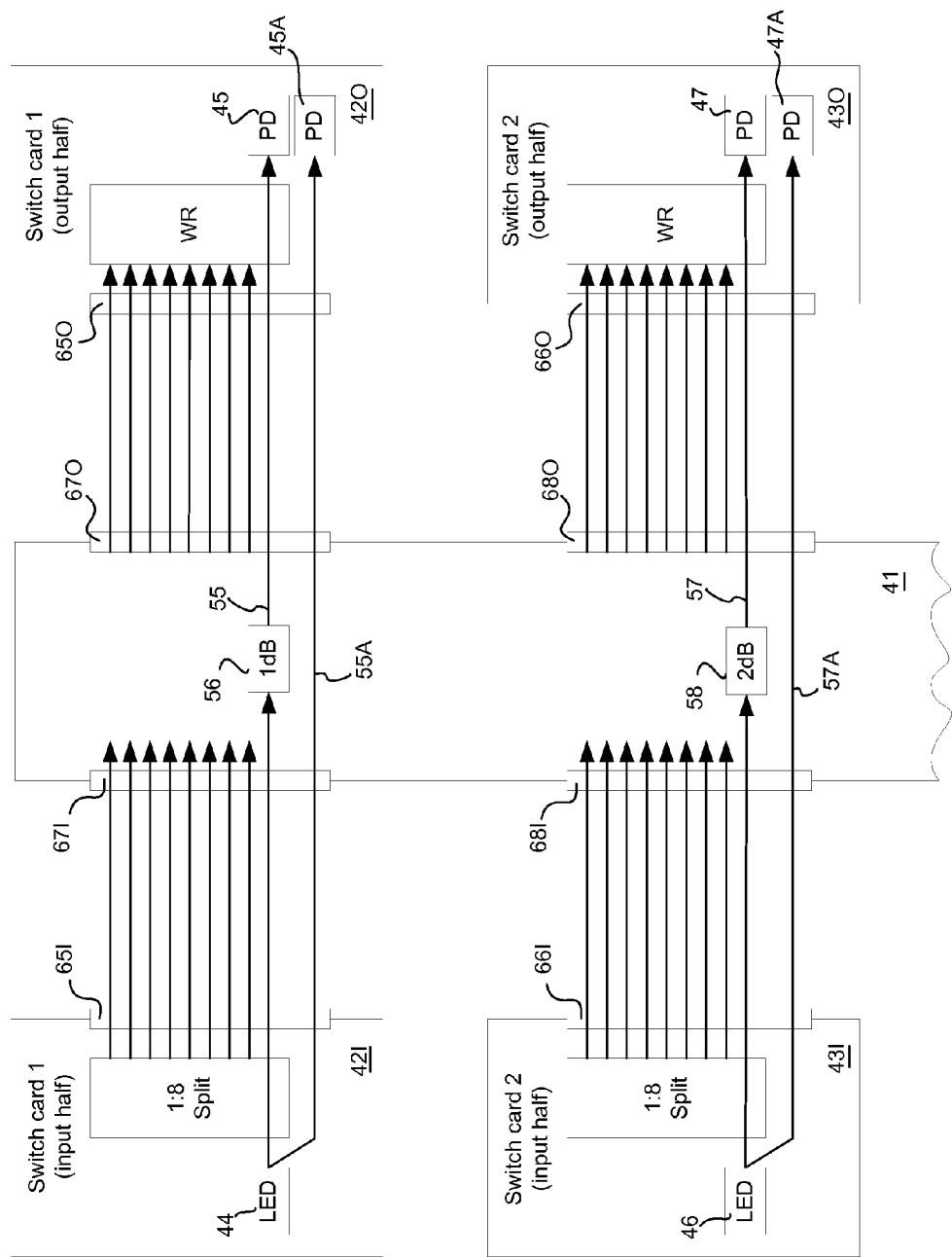
FIG. 5C illustrates still another arrangement and organization of a fiber organizer and switch cards which verifies the correct connection between the fiber organizer and switch cards, according to an embodiment of the present invention.

A solution to this problem is found in the fiber organizer 41 of FIG. 5C where two control lines are provided for each input and corresponding output port. In the input half 42I, 43I of each switch card, the LED 44, 46 provides optical signals to both control lines through the switch card ports 65I and 66I. One control line 55, 57 has an attenuator 56, 58 with an attenuation level characteristic of that fiber organizer's input and its corresponding output port, e.g., input port 67I and output port 67O. PD 45, 47 is respectively responsive to the optical signals through the control line 55, 57. The other control line 55A, 57A has no added attenuation and PD 45A, 47A is respectively responsive to the optical signals through the unencumbered control line 55A, 57A. Assuming that any dirt in a port connector affects each control line equally, the right level of attenuation can be inferred from the difference of signal strengths in each pair of control lines (55, 55A) and (57, 57A), regardless of any added connector loss.

Figure 5D:
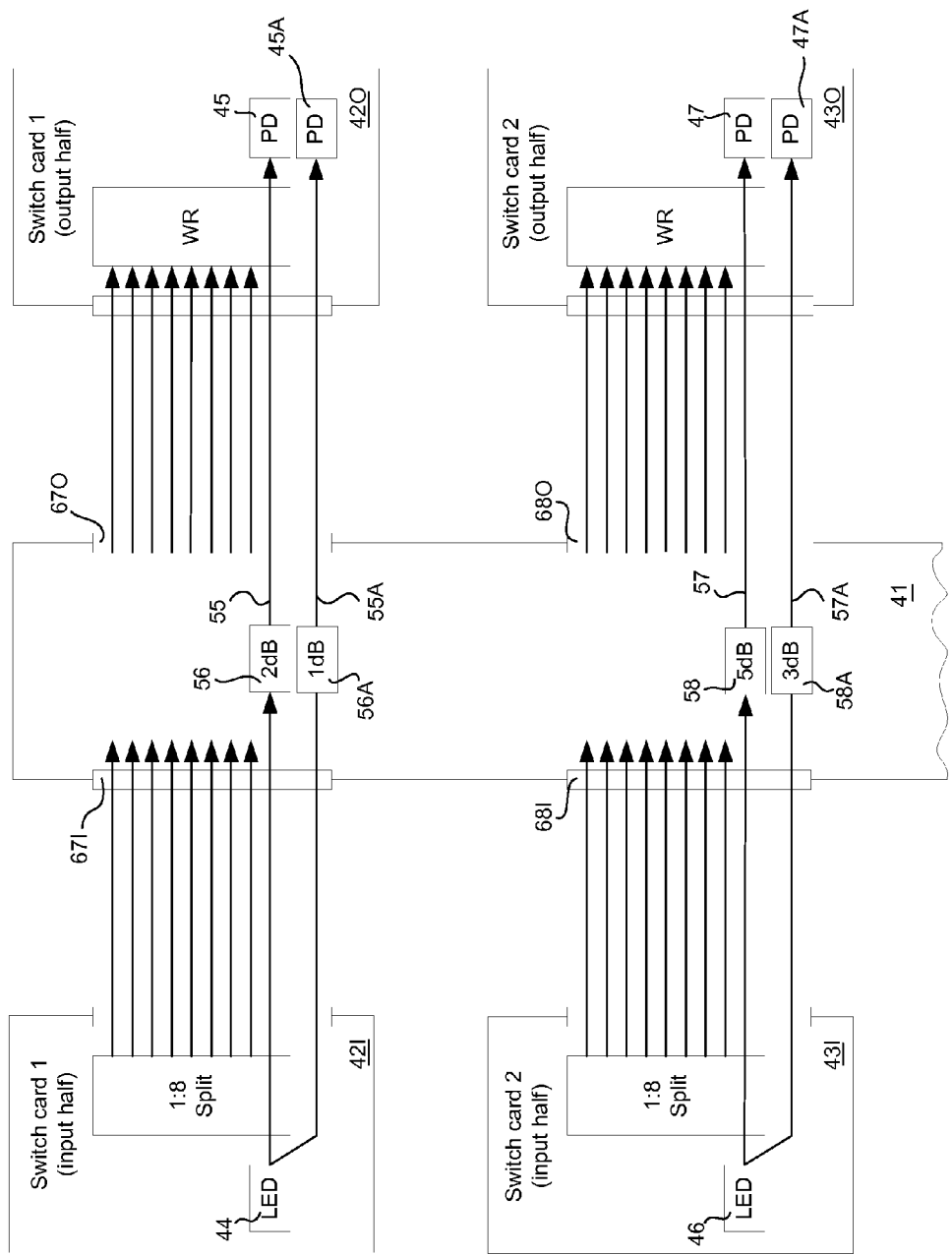
FIG. 5D illustrates yet another arrangement and organization of a fiber organizer and switch cards which verifies the correct connection between the fiber organizer and switch cards, according to another embodiment of the present invention.

Another way of verifying proper port connection is illustrated in FIG. 5D in which attenuators 56A and 58A are added to the respective control lines 55A and 57A of FIG. 5C. The two attenuation values for each fiber organizer input port and corresponding output port are used as a code to better identify the particular ports. Port identification is made less sensitive to different insertion losses on individual fibers on the ribbon cable connecting the switch card and fiber organizer. The two control lines, e.g., 55 and 55A, may be placed at the opposite extreme positions of a port connector to ensure that the fibers between the two control lines have similar insertion losses.

Figure 6A:
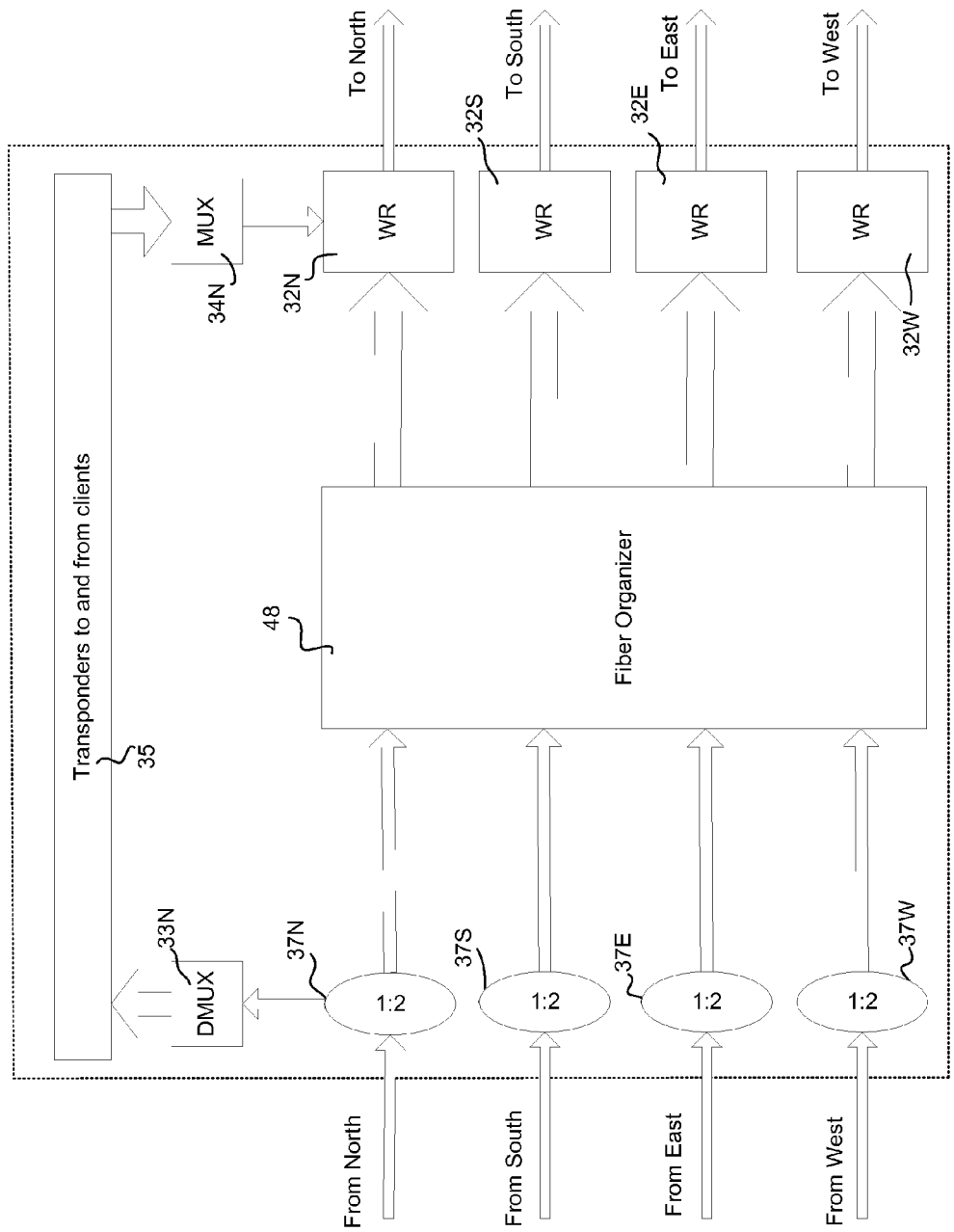
FIG. 6A shows another distributed switching architecture for a mesh node with a fiber organizer according to the present invention.
Figure 6B:
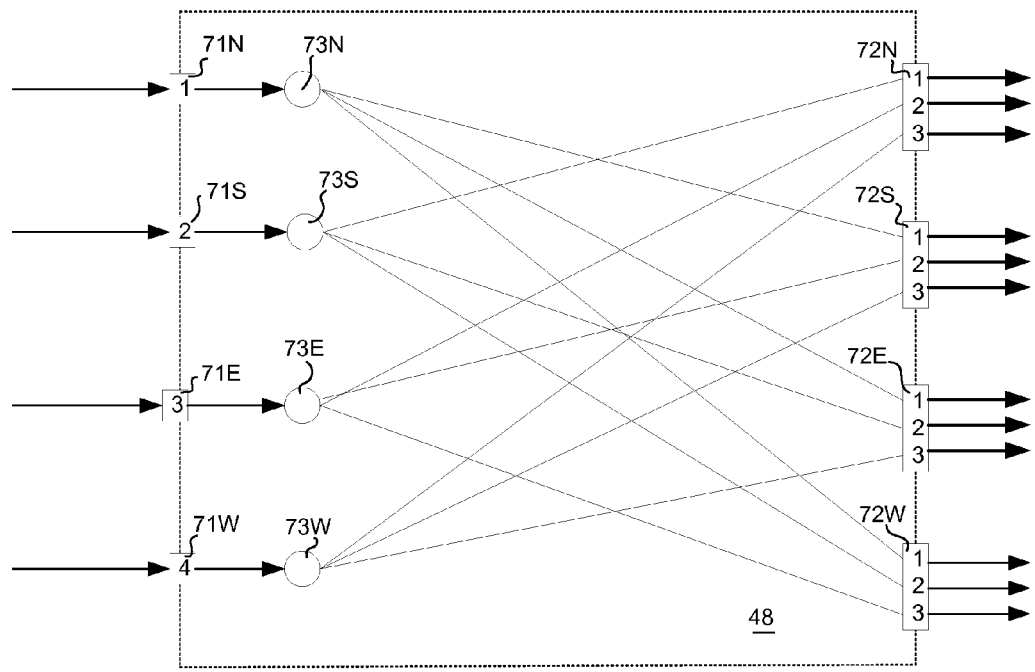
FIG. 6B illustrates the details of the fiber organizer of the FIG. 6A architecture.

FIG. 6A shows another distributed switching architecture for a mesh node. In this architecture, the input wavelength routers of FIG. 2A and 1:4 splitters of FIG. 2B are replaced by 1:2 splitters 37N, 37S, 37E and 37W. That is, each splitter 37N, 37S, 37E and 37W splits its incoming signals between its corresponding demultiplexer 33N (and 33S, 33E and 33W not shown) and input ports 71N, 71S, 71E and 71W of a fiber organizer 48. As shown in FIG. 6B, the fiber organizer 48 has 1:3 optical splitters 73N, 73S, 73E and 73W which are respectively connected to one output of the splitters 37N, 37S, 37E and 37W through the input ports 71N, 71S, 71l and 71W. The optical signals are split by the optical splitters 73N, 73S, 73E and 73W and optical fiber carry the split signals to the appropriate output ports 72N, 72S, 72E and 72W (and their corresponding output wavelength routers 32N, 32S, 32E and 32W).

Since the 1:2 splitters 37N, 37S, 37E and 37W are passive components, one alternative to the fiber organizer 48 is to integrate these components onto the fiber organizer, rather than on the switch cards which must be accordingly modified.

Returning to FIG. 6B, it should be noted that the fiber organizer 48 has no control lines. Therefore connectivity verification is done based on a negative indication. A test signal is placed in each input port of the fiber organizer 48. If the connection is correct, the only output port which does not receive the test signal is the one which corresponds to the input port.

Figure 6C:
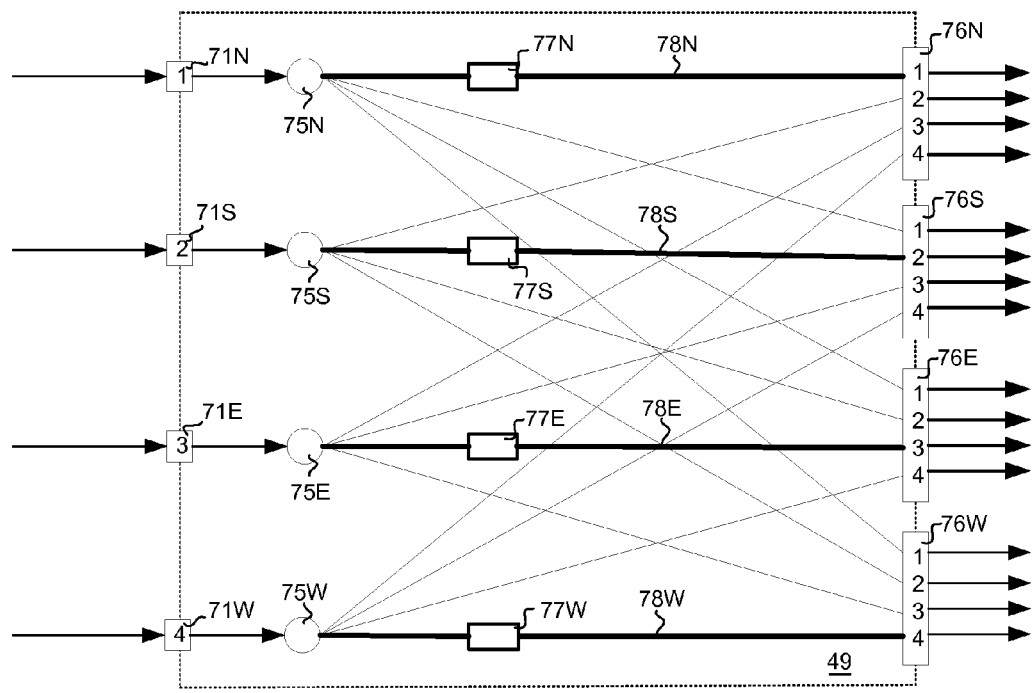
FIG. 6C illustrates the details of another fiber organizer of the FIG. 6A which allows the verification of the correct connection between the fiber organizer and switch cards.

FIG. 6C illustrates another fiber organizer 49 which is also useful for the distributed switching architecture of FIG. 6A. Connections of the switch cards to the ports of the fiber organizer and that the connections have been made correctly can be verified. The optical splitters 75N, 75S, 75E and 75W of the fiber organizer 49 have a splitting ratio of 1:4, rather than 1:3, to accommodate the added control lines 78N, 78S, 78E and 78W (shown by darkened lines) which connect each input port 71N, 71S, 71E and 71W to its corresponding output port 76N, 76S, 76E and 76W. The output ports are also expanded to accommodate the added control lines. On each control line 78N, 78S, 78E and 78W is a corresponding attenuator 77N, 77S, 77E and 77W with a particular attenuation value to allow identification of the particular port.

Any light entering a fiber organizer input port appears at all of the output ports 76N, 76S, 76E and 76W. The fiber organizer 49 does not allow differentiation between the different fiber organizer input ports based on attenuation as there are no extra control lines associated with the connection between the switch card and input port of the fiber organizer 49. Instead, to verify proper connections light is injected into the fiber organizer 49 during installation of a switch card. The light source from the switch card can be a device, such as a pre-amplifier, a transponder, or a dedicated test device that uses a low-cost laser, which is connected to the fiber organizer 49. The light source emits a test signal that is detectable by photodiodes of the incoming interfaces on the output wavelength routers. For example, this could be a fixed on/off sequence that is slow enough, say, 1 Hz transitions between on and off, to avoid interfering with normal operations.

The newly installed switch card is connected to port X, input and output, of the fiber organizer 49. Then a test signal in injected into the input port X. The test signal should appear on the connecting fiber from input port X to all of the output ports. This allows the output wavelength routers to report the test signal's appearance, thereby verifying that the input port is connected properly (and also to assess whether any path inside the fiber organizer is overly attenuated). However, the signal on output port X should be significantly attenuated due to the added attenuator on the path from input port X. See FIG. 6C. This allows verification of the correct switch card ribbon cable connections to the input and output ports X of the fiber organizer 49.

Figure 7A:
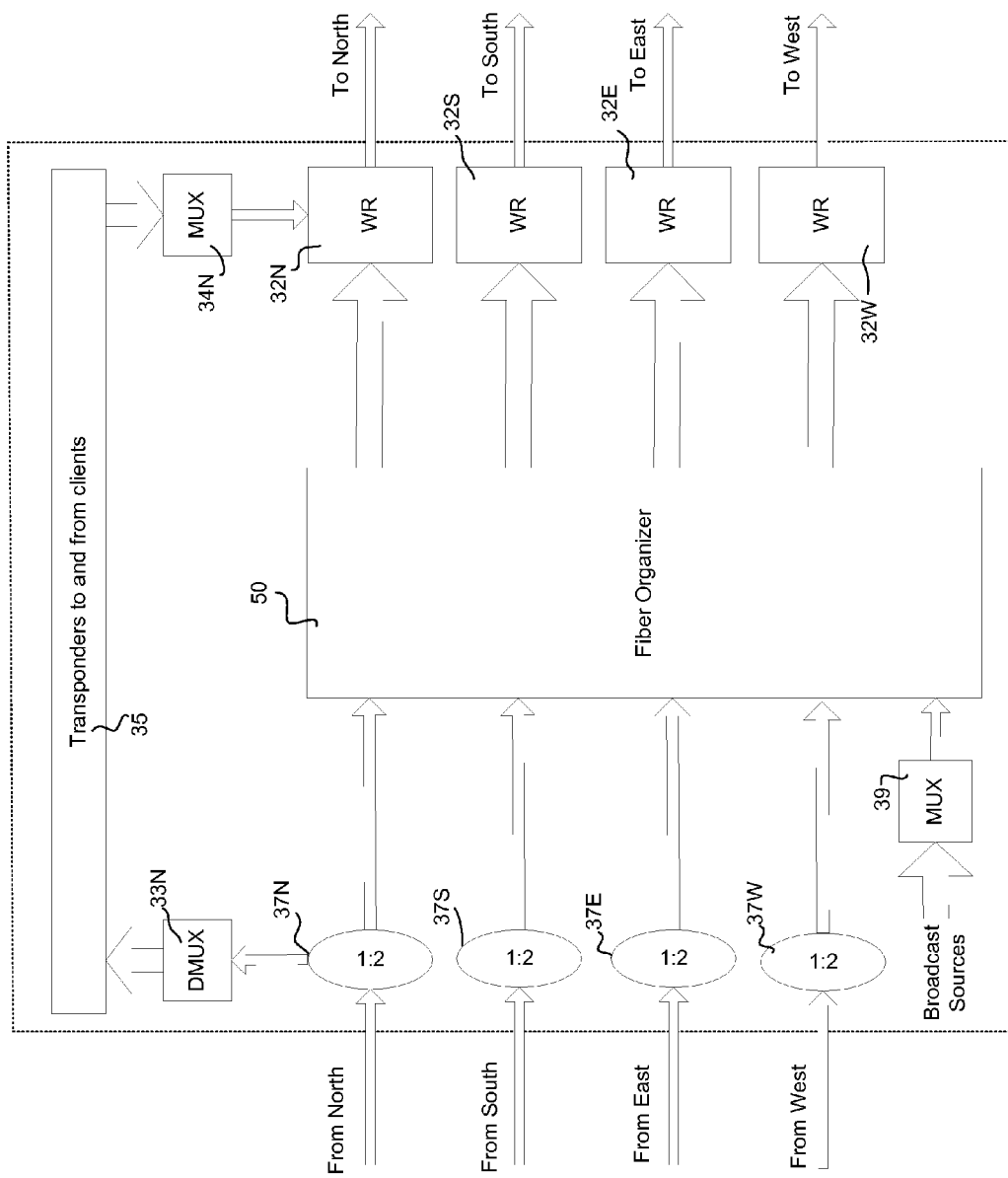
FIG. 7A shows another mesh node distributed switching architecture having broadcast functions according to an embodiment of the present invention.

FIG. 7A illustrates a variation of the FIG. 6A distributed switching architecture. In this architecture provision is made to receive optical signals for broadcast distribution through the output wavelength routers. In addition to receiving optical signals from the 1:2 input optical splitters 37N, 37S, 37E and 37W, the fiber organizer 50 also receives optical signals which are sent to all the output wavelength routers 32N, 32S, 32E and 32W. A multiplexer 39 receives the multiple sources for broadcast.

Figure 7B:
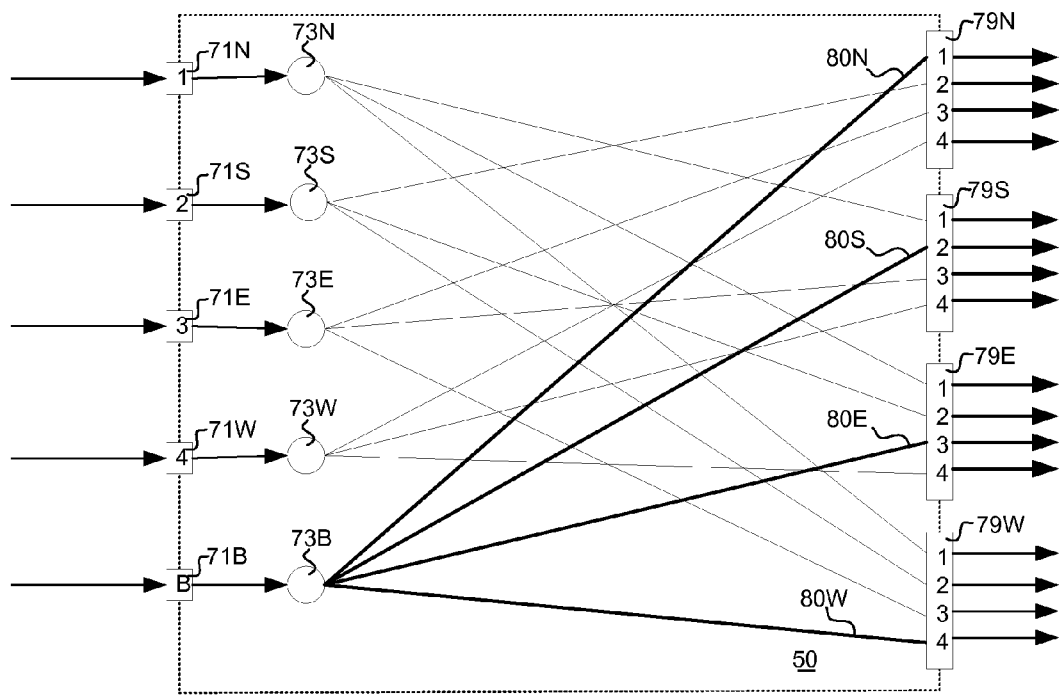
FIG. 7B illustrates the details of the fiber organizer in the FIG. 7A architecture.

FIG. 7B illustrates the details of the fiber organizer 50 of the FIG. 7A architecture. Similar to the fiber organizer 42 of FIG. 7A, the fiber organizer 50 has an additional broadcast input port 71B. Each of the input ports 71N, 71S, 71E and 71W is connected to optical splitters 73N, 73S, 73E and 73W respectively, and the broadcast input port 71B, is connected to an optical splitter 73B. As described previously, each of the 1:3 optical splitters 73N, 73S, 73E and 73W is connected to the output ports 79N, 79S, 79E and 79W which do not correspond to the input port of the particular optical splitter. On the other hand, the 1:4 optical splitter 73B is connected to each of the output ports 79N, 79S, 79E and 79W by broadcast lines 80N, 80S, 80E and 80W (darkened in the drawing). To accommodate addition of a broadcast line, each of the output ports 79N, 79S, 79E and 79W is expanded to receive four optical fibers.

For testing and verifying the connections of the switch cards to the fiber organizer 50, the broadcast input port 71B is connected to the unused fiber positions of the output ports 79N, 79S, 79E and 79W. A test signal injected into the broadcast input port 71B should be detected at the different positions at the output ports 79N, 79S, 79E and 79W to verify the connection of input to the broadcast input port. Verification of the connections to the other input ports 71N, 71S, 71E and 71W is done in the same manner as the fiber organizer 48 of FIG. 6B.

Figure 8A:
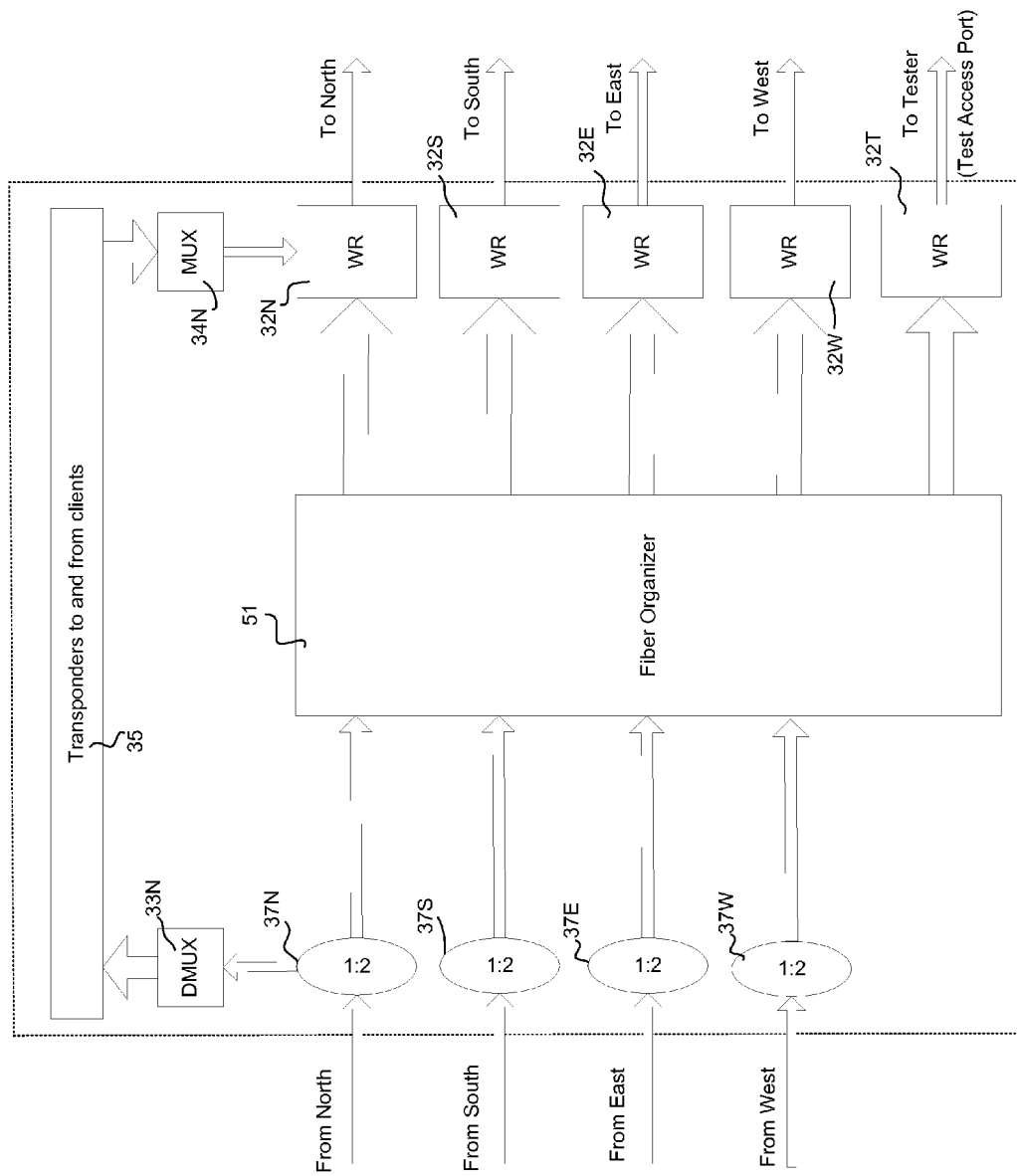
FIG. 8A shows a mesh node distributed switching architecture with a Test Access Port for testing the architecture connections according to an embodiment of the present invention.
Figure 8B:
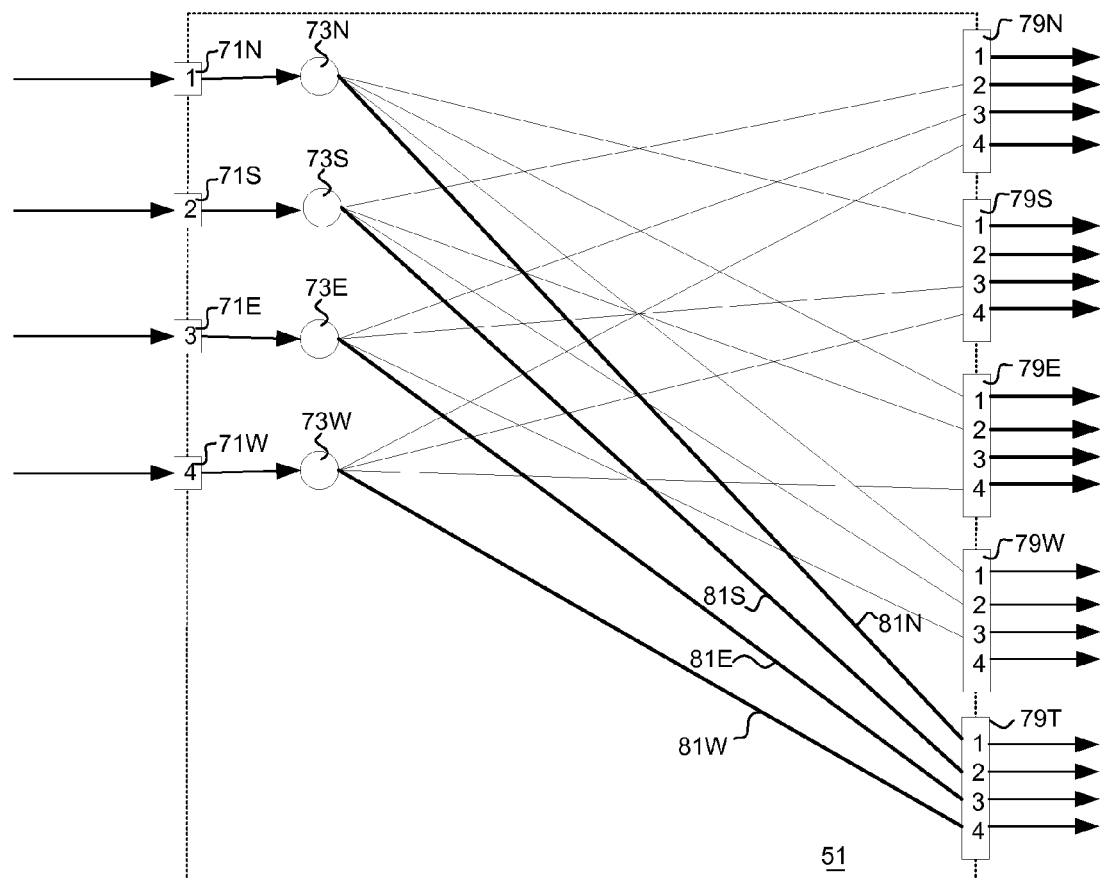
FIG. 8B illustrates the details of the fiber organizer in the FIG. 8A architecture.

Another variation or extension of the present invention is shown in FIG. 8A which shows the mesh node architecture with a port for testing the connections of the architecture. In this embodiment an output wavelength router 32T is added for a Test Access Port (TAP) which is connected to a tester, i.e., test equipment, for checking whether the connections have been properly made or not. FIG. 8B illustrates the details of the fiber organizer 51 of the FIG. 8A architecture. Test control lines 81N, 81S, 81E and 81W (darkened for better illustration) respectively connect each of the optical splitters 73N, 73S, 73E and 73W (which are now 1:4 splitters) to different positions of a test output port 79T which is connected to the wavelength router 32T. Thus the wavelength router 32T, through the test control lines 81N, 81S, 81E and 81W and the optical splitters 73N, 73S, 73E and 73W, can selectively send incoming signals to the mesh node and the corresponding fiber organizer input ports 71N, 71S, 71E and 71W to the TAP and its connected test equipment.

Figure 9B:
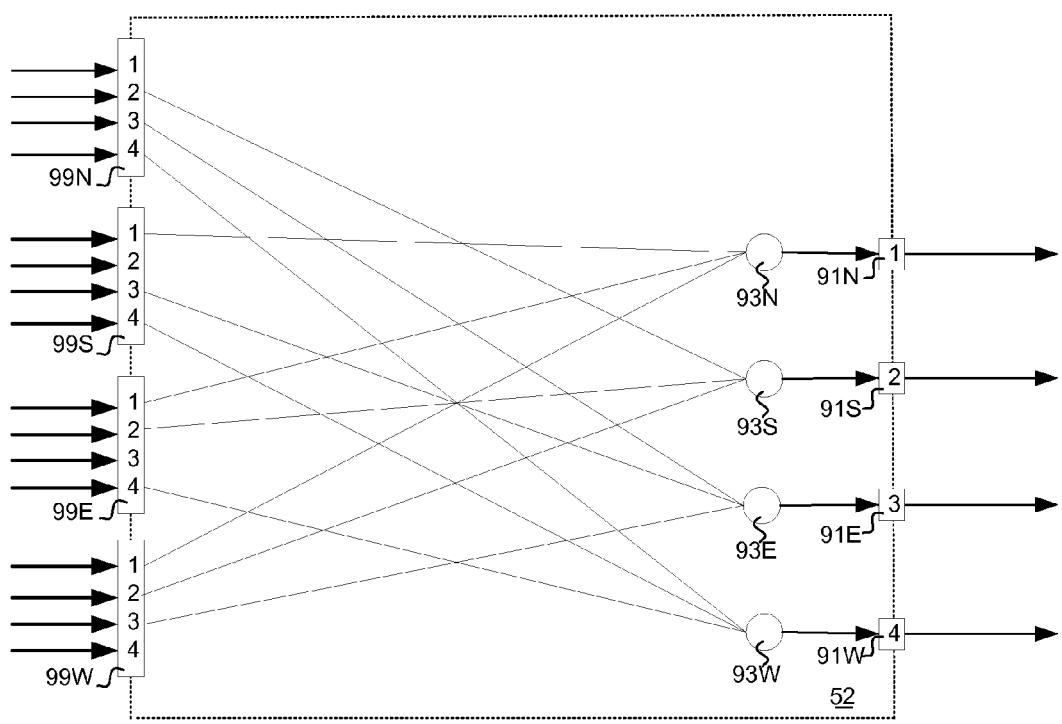
FIG. 9B illustrates the details of the fiber organizer adapted for the FIG. 9A architecture.
Figure 9A:
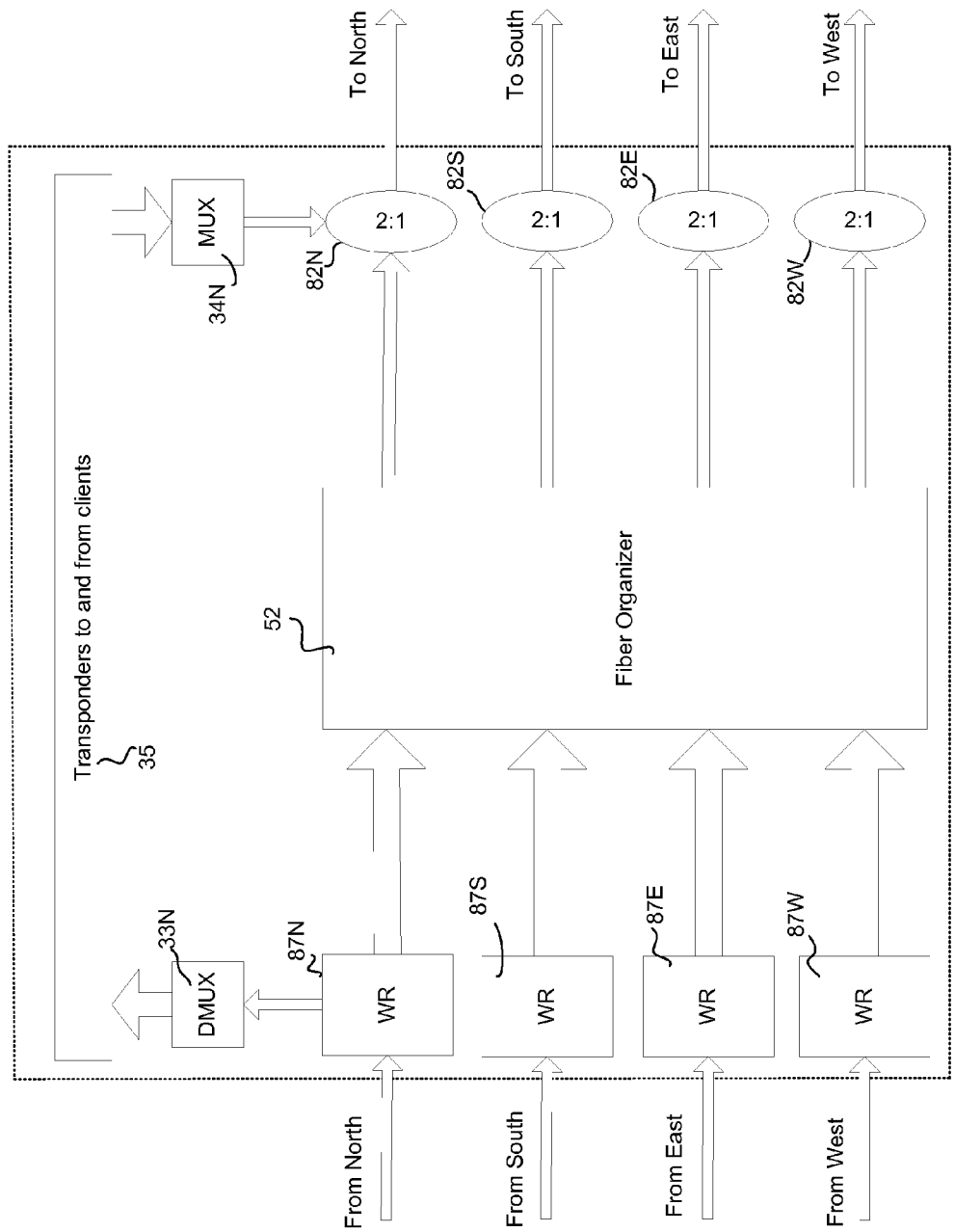
FIG. 9A shows a mesh node distributed switching architecture having its elements reversed according to still another embodiment of the present invention.

The elements of the mesh node distributed architecture are reversed in FIG. 9A. In this embodiment of the present invention, the wavelength routers are on the input side of and the optical splitters (but operating as optical combiners) are on the output side of the architecture. Input wavelength routers 87N, 87S, 87E and 87W receive incoming signals from the respective mesh node directions. Each router is connected to its corresponding demultiplexer 33N (and 33S, 33E and 33W not shown) for dropping signals at the node, and to its corresponding input port of a fiber organizer 52. The output ports of the fiber organizer 52 are connected to one input of 2:1 optical combiners 82N, 82S, 82E and 82W. The other input to the optical combiners 82N, 82S, 82E and 82W are connected to the outputs of the corresponding multiplexer 34N (and 34S, 34E and 34W) for adding signals at the node. Operations of the input wavelength routers 87N, 87S, 87E and 87W direct signals to the selected mesh node direction and for dropping at the node.

These operations may be clearer with the details of the fiber organizer 52 illustrated in FIG. 9B. Input ports 99N, 99S, 99E and 99W are respectively connected to the input wavelength routers 87N, 87S, 87E and 87W with each router connected to three of the four positions of the input port. The unconnected position corresponds to the mesh node direction of the input wavelength router. Output ports 91N, 91S, 91E and 91W are respectively connected to the optical combiners 82N, 82S, 82E and 82W. Within the fiber organizer 52, 3:1 optical combiners 93N, 93S, 93E and 93W are each connected to a corresponding output ports 91N, 91S, 91E and 91W and to three of the four input ports 99N, 99S, 99E and 99W. The fourth and unconnected input port corresponds to the mesh node direction of the optical combiner's output port. For example, the optical splitter 93N (and its output port 91N) is not connected to the input port 99N.

Thus an input wavelength router 87N, 87S, 87E and 87W receives incoming optical signals from its corresponding network direction and selects their outgoing mesh node direction(s) by sending the signals to selected positions of the router's corresponding input port 99N, 99S, 99E and 99W. Each router can also drop the incoming signals by sending them to its corresponding demultiplexer 33N, 33S, 33E and 33W.

Other variations and extensions of the present invention are possible. While different features and embodiments of the present invention have been described separately, they may be combined. For example, the broadcast and TAP features of FIGS. 7A and 8A may be combined without extensive modifications to accommodate the combined features. Furthermore, the fiber organizers may be rearranged so that input ports are connected to their corresponding output ports. As explained earlier, such connections allow for the possibility of optical signals from one mesh node direction being switched to return to the direction. From a data transfer perspective, such switching is illogical. However, such optical signal movement permits further testing of the switching operations at a mesh network node.

Still another example is that the fiber organizer can be expanded forward by integrating the optical splitters which are used in place of input wavelength routers. See the optical splitters on the switch cards in FIGS. 2B, 5A-5D, 6, and 9. With this integration, the inputs to the optical splitters become the input ports of the passive fiber organizer and the switch cards, less the optical splitters, continue to carry active components. The client drop function demultiplexers 33N et al. and the client add functions multiplexers 34N et al., which are passive devices, can also included in the fiber organizer.

In summary, the passive fiber organizer of the present invention interconnects the switching DWDM devices of a distributed switching architecture without requiring detailed instructions as to which port needs to be connected to a specific other port. Additional features allow for automatic detection of connectivity. Misconnections are avoided to provide huge operational benefits, especially for high capacity nodes.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. In a mesh node of a WDM optical network, said mesh node having a plurality of optical signal directing input devices, a plurality of optical signal directing output devices, and an optical fiber organizer for interconnecting said plurality of optical signal directing input devices and said plurality of optical signal directing output devices, said optical fiber organizer comprising:

a plurality of input ports, each input port connected to one of said plurality of optical signal directing input devices;

a plurality of output ports, each output port connected to one of said plurality of optical signal directing output devices and corresponding to one of said plurality of input ports;

a plurality of optical paths, each optical path connecting one of said plurality of input ports to one of said plurality of output ports, wherein each optical path is connected between a position on one of said plurality of input ports and one of at least three positions on one of said plurality of output ports; and wherein said optical fiber organizer has no active components.

2. The fiber organizer of claim 1 wherein each of said plurality of optical paths comprises an optical fiber and further comprising a housing for providing a base for mounting connectors for said input and output ports, and for protecting said plurality of optical path fibers.

3. The fiber organizer of claim 2 wherein said connectors for said input ports comprise ribbon or array connectors.

4. The fiber organizer of claim 2 wherein said connectors for said output ports comprise ribbon or array connectors.

5. The fiber organizer of claim 2 wherein said housing comprises solid plastic for encasing said plurality of optical path fibers.

6. The fiber organizer of claim 5 wherein said connectors are located at edges of said housing to receive said optical path fibers.

7. The fiber organizer of claim 1 wherein each optical path connects one of said plurality of input ports to one of said plurality of output ports not corresponding to said one of said plurality of input ports.

8. The fiber organizer of claim 7 further comprising a first plurality of verification optical paths, each verification path connecting one of said plurality of input ports to a corresponding one of said plurality of said output ports so that an optical signal on said verification path at said one of said plurality of input ports appears at said corresponding one of said plurality of said output ports.

9. The fiber organizer of claim 8 wherein each first plurality verification optical path includes an attenuator having an attenuation level identifying said one of said plurality of input ports and said corresponding one of said plurality of output ports.

10. The fiber organizer of claim 9 further comprising a second plurality of verification optical paths, each second plurality verification optical path connecting in parallel with one of said first plurality verification optical paths one of said plurality of input ports to a corresponding one of said plurality of output ports so that an optical signal on said second plurality verification optical path at said one of said plurality of input ports appears at said corresponding one of said plurality of said output ports.

11. The fiber organizer of claim 10 wherein each second plurality verification optical path includes no attenuator.

12. The fiber organizer of claim 10 wherein each second plurality verification optical path includes an attenuator having an attenuation value identifying said one of said plurality of input ports and said corresponding one of said plurality of output ports in combination with an attenuation value of an attenuator in said one first plurality verification optical path in parallel with said second plurality verification optical path.

13. The fiber organizer of claim 1 wherein said plurality of optical paths further comprises
 a plurality of optical splitters;
 a plurality of first optical paths, each first optical path connected one of said plurality of each input ports and one of said plurality of optical splitters; and
 a plurality of second optical paths, each second optical path connected to one of said plurality of optical splitters and one of said plurality of output ports so that each optical path comprises a first optical path, an optical splitter and a second optical path.

14. The fiber organizer of claim 13 wherein each optical path connects one of said plurality of input ports to one of said plurality of output ports not corresponding to said one of said plurality of input ports.

15. The fiber organizer of claim 14 further comprising a plurality of verification paths, each verification path connecting one of said plurality of input ports to a corresponding one of said plurality of said output ports corresponding to said one of said plurality of input ports through one of said optical splitters connected to said one of said plurality of input ports, each verification optical path including an attenuator.

16. The fiber organizer of claim 1 wherein said plurality of optical paths further comprises
 a plurality of optical combiners;
 a plurality of first optical paths, each first optical path connected to one of said plurality of input ports and one of said plurality of optical combiners; and
 a plurality of second optical paths, each second optical path connected to one of said plurality of optical combiners and one of said plurality of each output ports so that each optical path comprises a first optical path, an optical combiner and a second optical path.

17. The fiber organizer of claim 1 further comprising a broadcast input port and a plurality of broadcast optical paths, each broadcast optical path connecting said broadcast input port to each one of said output ports.

18. The fiber organizer of claim 17 wherein said plurality of optical paths further comprises
 a plurality of optical splitters;
 a plurality of first optical paths, each first optical path connected one of said plurality of each input ports and one of said plurality of optical splitters;
 a plurality of second optical paths, each second optical path connected to one of said plurality of optical splitters and one of said plurality of output ports so that each optical path comprises a first optical path, an optical splitter and a second optical path;
 a broadcast optical splitter;
 a first broadcast optical path connected to said broadcast input port and to said broadcast optical splitter; and
 a plurality of second broadcast optical paths, each second broadcast optical path connecting said broadcast optical splitter to each one of said output ports.

19. The fiber organizer of claim 1 further comprising a test access port and a plurality of test optical paths, each test optical path connecting each one of said input ports to said test access port.

20. The fiber organizer of claim 19 wherein said plurality of optical paths further comprises
 a plurality of optical splitters;
 a plurality of first optical paths, each first optical path connected one of said plurality of each input ports and one of said plurality of optical splitters;
 a plurality of second optical paths, each second optical path connected to one of said plurality of optical splitters and one of said plurality of output ports so that each optical path comprises a first optical path, an optical splitter and a second optical path; and
 a plurality of second test optical paths, each second test optical path connecting one of said optical splitters to said test access port so that each test optical path comprises a first optical path, an optical splitter and a second test optical path.

21. In a mesh node of a WDM optical network, said mesh node having a plurality of switch cards and an optical fiber organizer interconnecting said switch cards, each switch card connected to optical fibers to and from at least one mesh node direction and including at least one wavelength directing output device for selectively sending optical signals received by said switch card to an optical fiber to said at least one mesh node direction, said optical fiber organizer comprising:
 a plurality of first input optical splitters, each first input optical splitter connected to one of said plurality of switch cards;
 a plurality of output ports, each output port connected to one of said plurality of switch cards; and
 a plurality of optical paths, each optical path connecting one of said plurality of first input optical splitters to one of said plurality of output ports, wherein each optical path is connected between one of said plurality of first input optical splitters and one of at least three positions on one of said plurality of output ports;
 wherein said optical fiber organizer has no active components.

22. The fiber organizer of claim 21 further comprising a plurality of second input optical splitters, each second input optical splitter connected to one of said plurality of first input optical splitters and each of said plurality of optical paths connecting one of said plurality of first input optical splitters to one of said plurality of output ports through a second input optical splitter.

23. The fiber organizer of claim 22 wherein each optical path connects one of said plurality of second input optical splitters to one of said plurality of output ports not corresponding to said one of said plurality of first input optical splitters.

24. The fiber organizer of claim 23 further comprising a first plurality of verification optical paths, each verification path connecting one of said plurality of second input optical splitters to a corresponding one of said plurality of said output ports so that an optical signal on said verification path from one of said plurality of switch cards appears at said one of said plurality of said output ports connected to said one said plurality of switch cards.

25. The fiber organizer of claim 24 wherein each first plurality verification optical path includes an attenuator for identifying said one of said first optical splitters and connected switch card and said corresponding one of said plurality of output ports.

26. A mesh node for a WDM optical network, comprising:
 a plurality of optical signal directing input devices;
 a plurality of optical signal directing output devices; and
 an optical fiber organizer interconnecting said plurality of optical signal directing input devices and said plurality of optical signal directing output devices, said optical fiber organizer comprising:

a plurality of input ports, each input port connected to one of said plurality of optical signal directing input devices;

a plurality of output ports, each output port connected to one of said plurality of optical signal directing output devices and corresponding to one of said plurality of input ports;

a plurality of optical paths, each optical path connecting one of said plurality of input ports to one of said plurality of output ports, wherein each optical path is connected between a position on one of said plurality of input ports and one of at least three positions on one of said plurality of output ports; and wherein said optical fiber organizer has no active elements.

27. The mesh node of claim 26 wherein each of said plurality of optical signal directing input devices comprises a 1×N optical splitter.

28. The mesh node of claim 27 wherein each of said plurality of optical signal directing input devices comprises a 1×2 optical splitter.

29. The mesh node of claim 26 wherein each of said plurality of optical signal directing input devices comprises a 1×N wavelength router.

30. The mesh node of claim 26 wherein each of said plurality of optical signal directing input devices comprises a 1×N wavelength selective switch.

31. The mesh node of claim 26 wherein each of said plurality of optical signal directing output devices comprises an N×1 optical combiner.

32. The mesh node of claim 31 wherein each of said plurality of optical signal directing output devices comprises a 2×1 optical combiner.

33. The mesh node of claim 26 wherein each of said plurality of optical signal directing output devices comprises an N×1 wavelength router.

34. The mesh node of claim 26 wherein each of said plurality of optical signal directing output devices comprises an N×1 wavelength selective switch.

35. The mesh node of claim 26 wherein said plurality of optical signal directing input devices and said plurality of optical signal directing output devices are on a plurality of switch cards each connected to said fiber organizer through said fiber organizer input and output ports.

36. The mesh node of claim 26 wherein said fiber organizer further comprises plurality of verification optical paths, each verification path connecting one of said plurality of input ports to a corresponding one of said plurality of said output ports so that an optical signal on said verification path at said one of said plurality of input ports appears at said corresponding one of said plurality of said output ports; and wherein each switch card further comprises a laser diode connected to an input port and a photodiode connected to a corresponding output port of said fiber organizer such that an optical signal from said laser diode is received by said photodiode.

37. The mesh node of claim 36 wherein each switch card manages optical signals to and from one network direction of said mesh node.

38. The fiber organizer of claim 1 wherein each of said plurality of optical signal directing input devices and each of said plurality of optical signal directing output devices are external to said optical fiber organizer.

39. The fiber organizer of claim 1 wherein each optical path is unbranched.

40. The fiber organizer of claim 1 wherein each optical path is undivided.

41. The fiber organizer of claim 1 wherein said fiber organizer has no electrical conductors.

42. The fiber organizer of claim 21 wherein each of said plurality of switch cards are external to said optical fiber organizer.

43. The fiber organizer of claim 21 wherein said fiber organizer has no electrical conductors.

44. The fiber organizer of claim 26 wherein each of said plurality of optical signal directing input devices and each of said plurality of optical signal directing output devices are external to said optical fiber organizer.

45. The fiber organizer of claim 26 wherein each optical path is unbranched.

46. The fiber organizer of claim 26 wherein each optical path is undivided.

47. The fiber organizer of claim 26 wherein said fiber organizer has no electrical conductors.

* * * * *